United States Patent
Yadav (10) Patent No.: US 7,290,059 B2
(45) Date of Patent: Oct. 30, 2007

(54) APPARATUS AND METHOD FOR SCALABLE SERVER LOAD BALANCING

(75) Inventor: Satyendra Yadav, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 967 days.

(21) Appl. No.: 09/929,380

(22) Filed: Aug. 13, 2001

(65) Prior Publication Data

US 2003/0033428 A1    Feb. 13, 2003

(51) Int. Cl.
    *G06F 15/16*    (2006.01)
(52) U.S. Cl. .................................... 709/242
(58) Field of Classification Search ........ 709/238–244, 709/225
    See application file for complete search history.

(56) References Cited

U.S. PATENT DOCUMENTS

| | | | |
|---|---|---|---|
| 5,341,477 A | 8/1994 | Pitkin et al. | |
| 5,495,426 A | 2/1996 | Waclawsky et al. | |
| 5,530,963 A * | 6/1996 | Moore et al. | 709/243 |
| 5,721,819 A * | 2/1998 | Galles et al. | 709/243 |
| 5,740,371 A | 4/1998 | Wallis | |
| 5,761,507 A | 6/1998 | Govett | |
| 5,774,660 A | 6/1998 | Brendel et al. | |
| 5,774,668 A | 6/1998 | Choquier et al. | |
| 5,802,316 A * | 9/1998 | Ito et al. | 709/249 |
| 5,828,847 A | 10/1998 | Gehr et al. | |
| 5,867,706 A | 2/1999 | Martin et al. | |
| 5,872,930 A | 2/1999 | Masters et al. | |
| 5,918,021 A | 6/1999 | Aditya | |
| 5,963,540 A * | 10/1999 | Bhaskaran | 370/218 |
| 6,023,722 A | 2/2000 | Colyer | |
| 6,078,943 A | 6/2000 | Yu | |
| 6,091,725 A * | 7/2000 | Cheriton et al. | 370/392 |
| 6,128,279 A | 10/2000 | O'Neil et al. | |
| 6,148,410 A * | 11/2000 | Baskey et al. | 714/4 |
| 6,178,160 B1 | 1/2001 | Balton et al. | |
| 6,182,138 B1 | 1/2001 | Aoki | |
| 6,182,139 B1 | 1/2001 | Brendel | |
| 6,185,601 B1 | 2/2001 | Wolff | |
| 6,185,619 B1 | 2/2001 | Joffe et al. | |
| 6,189,043 B1 * | 2/2001 | Buyukkoc et al. | 709/241 |
| 6,192,051 B1 * | 2/2001 | Lipman et al. | 370/389 |
| 6,195,680 B1 | 2/2001 | Goldszidt et al. | |
| 6,226,684 B1 * | 5/2001 | Sung et al. | 709/238 |
| 6,253,230 B1 * | 6/2001 | Couland et al. | 709/203 |
| 6,331,984 B1 * | 12/2001 | Luciani | 370/401 |
| 6,359,879 B1 * | 3/2002 | Carvey et al. | 370/351 |
| 6,424,992 B2 * | 7/2002 | Devarakonda et al. | 709/203 |
| 6,473,424 B1 * | 10/2002 | DeJager et al. | 370/389 |
| 6,496,510 B1 * | 12/2002 | Tsukakoshi et al. | 370/401 |
| 6,594,704 B1 * | 7/2003 | Birenback et al. | 709/238 |
| 6,625,659 B1 * | 9/2003 | Aramizu et al. | 709/239 |
| 6,667,975 B1 * | 12/2003 | DeJager et al. | 370/389 |
| 6,735,198 B1 * | 5/2004 | Edsall et al. | 370/389 |
| 6,779,039 B1 * | 8/2004 | Bommareddy et al. | 709/238 |
| 6,810,427 B1 * | 10/2004 | Cain et al. | 709/238 |
| 6,877,044 B2 * | 4/2005 | Lo et al. | 710/2 |
| 6,934,293 B1 * | 8/2005 | DeJager et al. | 370/401 |
| 6,947,415 B1 * | 9/2005 | Nagaraj | 370/389 |
| 6,947,963 B1 * | 9/2005 | Agarwal et al. | 709/201 |

\* cited by examiner

FOREIGN PATENT DOCUMENTS

EP    969630 A1 *  1/2000

*Primary Examiner*—Lewis A. Bullock, Jr.

(57) ABSTRACT

A server hosting system including a server cluster and a plurality of dispatchers, the plurality of dispatchers providing multiple points of entry into the server cluster. The server cluster and plurality of dispatchers are interconnected by a network, such as a system area network. Each of the dispatchers maintains a local dispatch table, and the local dispatch tables of the plurality of dispatchers, respectively, share data over the network.

12 Claims, 6 Drawing Sheets

| | 481 | 482 | 483 | 235 |
|---|---|---|---|---|
| | Client IP | Client Port | Server | |
| | $IP_{C1}$ | $Port_1$ | $MAC_{S3}$ | 470a |
| | $IP_{C1}$ | $Port_2$ | $MAC_{S1}$ | 470b |
| 470 | $IP_{C2}$ | $Port_1$ | $MAC_{S5}$ | 470c |
| | $IP_{C3}$ | $Port_1$ | $MAC_{S2}$ | |
| | $IP_{C3}$ | $Port_2$ | $MAC_{S2}$ | |
| | $IP_{C3}$ | $Port_3$ | $MAC_{S4}$ | |
| | $IP_{C4}$ | $Port_1$ | $MAC_{S1}$ | |
| | $IP_{C4}$ | $Port_2$ | $MAC_{SN}$ | |
| | $IP_{C5}$ | $Port_1$ | $MAC_{S2}$ | |
| | $IP_{C6}$ | $Port_1$ | $MAC_{S3}$ | |
| | $IP_{CX}$ | $Port_1$ | $MAC_{S5}$ | 470j |

APPARATUS AND METHOD FOR SCALABLE SERVER LOAD BALANCING

FIELD OF THE INVENTION

The invention relates generally to network servers (e.g., Internet servers) and, more particularly, to an apparatus and method providing scalable server load balancing.

BACKGROUND OF THE INVENTION

The number of users accessing the Internet has grown exponentially in recent years, and it is now commonplace for popular web sites to service millions of users, or clients, per day. For such a popular web site, thousands—and, in some instances, tens of thousands—of clients may attempt to access the web site at any given time. A single web server at the host site is no longer adequate to satisfy the demand for access. A failure to provide access to a web site is especially troublesome for business applications, where the lack of client access may lead to frustrated customers and/or lost revenue. Even for those situations where a single server is sufficient to service all clients accessing a web site, a single server provides minimal ability to increase capacity if network traffic on that web site grows. In other words, a single server does not provide scalability.

Figure 1:
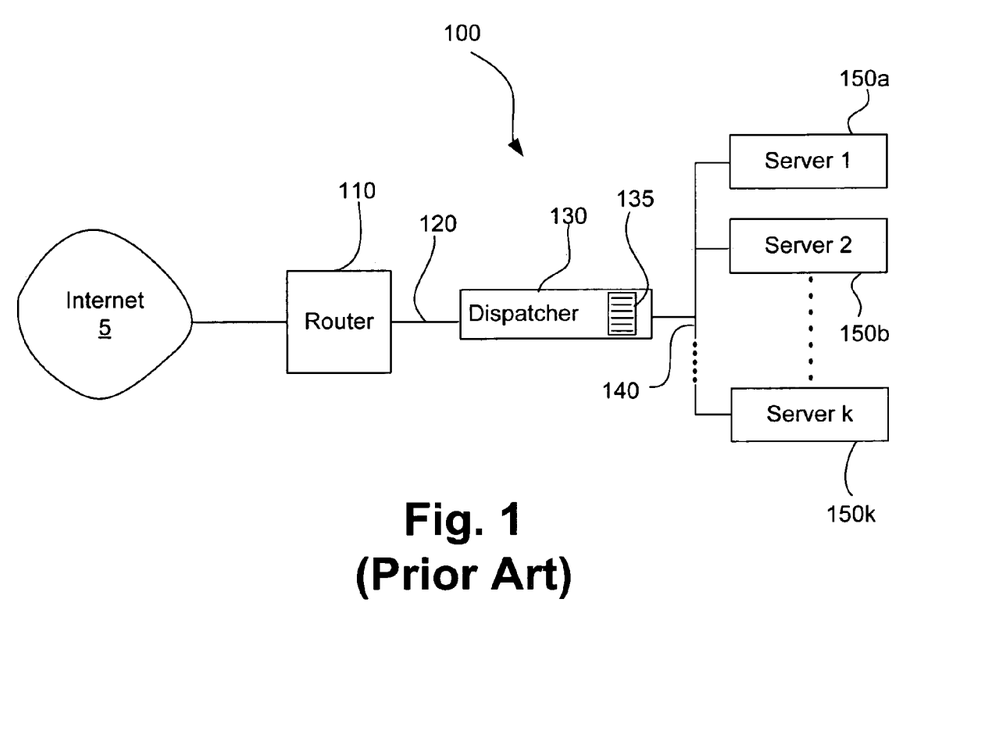
FIG. 1 shows an exemplary embodiment of a conventional server hosting system.

To increase the capacity of a web site, it is known to deploy a plurality of servers, or a server cluster, at the host site, as illustrated in FIG. 1. Referring to FIG. 1, a server hosting system 100 includes a plurality of servers 150, including servers 150a, 150b, . . . , 150k, that are coupled with a dispatcher 130 via a network 140, the network 140 typically having an Ethernet-based architecture. A communication link 120 couples the dispatcher 130 with a router 110, and the router 110, in turn, is coupled to the Internet 5. The server cluster 150a-k is assigned a single IP (Internet Protocol) address, or virtual IP address (VIP), and all network traffic destined for—or originating from—the server cluster 150a-k flows through the dispatcher 130. Thus, the server cluster 150a-k appears as a single network resource to those clients accessing the server hosting system 100.

When a client attempts to establish a connection with the server hosting system 100, a packet including a connection request (TCP SYN) is received from the client at router 110, and the router 110 transmits the packet to the dispatcher 130. The dispatcher 130 will select one of the servers 150a-k to process the connection request. In selecting a server 150, the dispatcher 130 employs a load balancing mechanism to balance all incoming connection requests among the plurality of servers 150a-k.

A number of load balancing mechanisms are known in the art. The dispatcher 130 may, for example, selectively forward a connection request to a server 150 based, at least in part, upon the load on each of the servers 150a-k. This form of load balancing is often referred to as "transactional" load balancing. Another load balancing mechanism commonly employed is known as "application-aware," or "content-aware," load balancing. In application-aware load balancing, a packet including a connection request is forwarded to a server 150 that is selected based upon the application associated with the packet. Stated another way, the packet is routed to a server 150, or one of multiple servers, that provides the application (e.g., email) initiated or requested by the client.

Using the load balancing mechanism, the dispatcher 130 selects one of the servers 150a-k and transmits the packet containing the connection request to the selected server 150 for processing. To route the packet to the selected server 150, the dispatcher's network address—e.g., layer 2 address or MAC (Media Access Control) address—is replaced with the selected server's network address. The selected server 150 then sends an acknowledgement (TCP SYN-ACK) to the client and creates a session.

A dispatch table 135 containing a list of each session in progress is maintained in the dispatcher 130. When a session is created, the dispatcher 130 places a session entry in the dispatch table 135, the session entry identifying the client and the server 150 selected for that session. Accordingly, the server 150 assigned to a session can be identified while that session is in progress, and any packet subsequently received from the client can be associated with the selected server 150—i.e., the dispatcher's network address replaced with the selected server's network address—and the packet forwarded thereto. Thus, once a session has been established, all additional packets received at the dispatcher 130 and associated with that session are routed to the selected server 150.

When a packet including a termination request (TCP FIN) is received from the client, the dispatcher 130 removes the corresponding session entry from the dispatch table 135 and forwards that packet to the selected server 150. The selected server 150, in turn, terminates the session with the client.

The performance of a web site can be enhanced by employing a server cluster in conjunction with server load balancing, as shown and described above with respect to FIG. 1. Such an approach eliminates the bottleneck that occurs in a single server system; however, in many instances, as the number of clients attempting to gain access to a web site grows, the bottleneck is simply shifted to the dispatcher, which provides only a single entry point to the server cluster. It follows, therefore, that the dispatcher and server cluster system is not amenable to scaling for increased capacity, as the addition of more servers into the cluster will simply intensify the bottleneck occurring at the dispatcher. Further, this conventional load balancing solution provides minimal fault tolerance, as a failure at the dispatcher can disrupt operation of the entire system.

DETAILED DESCRIPTION OF THE INVENTION

Figure 2:
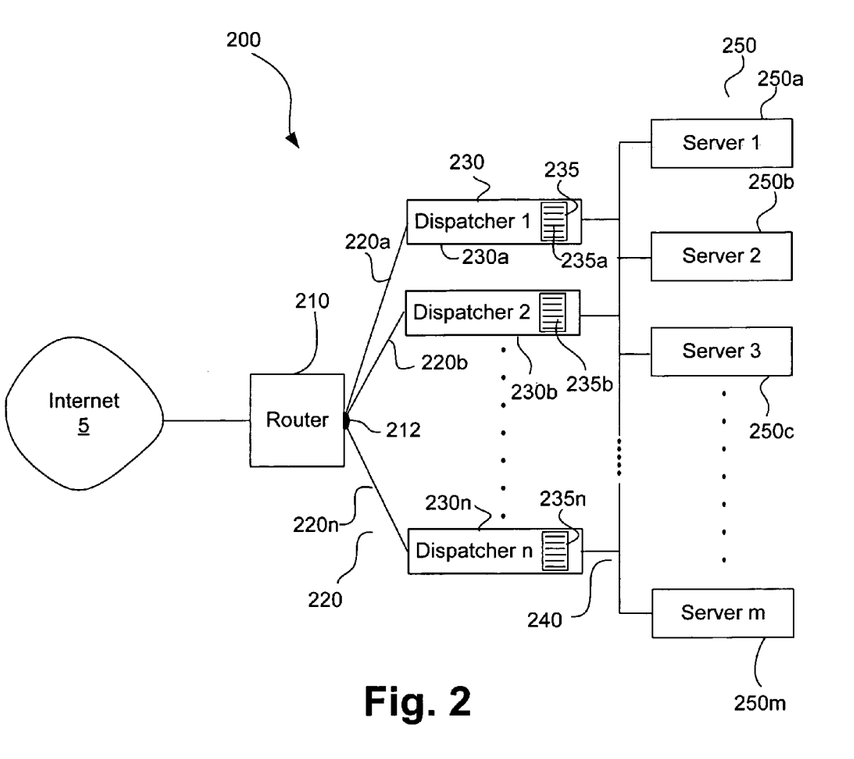
FIG. 2 shows an embodiment of a server hosting system including multiple dispatchers.

Referring to FIG. 2, a server hosting system 200 includes a router 210 coupled with the Internet 5, the router 210 including at least one port 212. The router 210 may comprise any suitable routing device known in the art, including any commercially available, off-the-shelf router. A plurality of communication links 220, including communication links 220a, 220b, ..., 220n, are coupled with the port 212 on router 210, the port 212 being adapted for "port trunking" (also referred to as "port aggregation"). One of a plurality of dispatchers 230 is coupled with each communication link 220.

In an exemplary embodiment of port trunking at port 212, the router 210 does not "know" what is coupled with each of the communication links 220a-n, and the router 210 simply attempts to optimize use of the communication links 220a-n. When a client packet is received at the router 210 and that packet is to be transmitted to one of the dispatchers 230, the router 210 arbitrarily selects one of the communications links 220a-n and transmits the packet over the selected communication link 220 to the corresponding dispatcher 230 coupled therewith. In an alternative embodiment, rather than randomly selecting one of the communication links 220a-n, a communication link 220 may be selected based on a known policy or set of rules. For example, the router 210 may alternate between the communications links 220a-n in a round robin fashion, or the router 210 may make its selection based upon the load on each of the communication links 220a-n. It should be understood that, although the router 210 generally has no "knowledge" of the dispatchers 230a-n, it is within the scope of the present invention for the router 210 to initially select a dispatcher 230 for receipt of an incoming packet and to then choose the communication link 220 coupled with the selected dispatcher 230. Port trunking at port 212 of router 210 may be software and/or hardware controlled.

A plurality of dispatchers 230, including dispatchers 230a, 230b, ..., 230n, is coupled with the port 212 of router 210, each of the dispatchers 230a-n being coupled with the port 212 via one of the communication links 220a-n, respectively, as noted above. Due to port trunking at the router port 212, the plurality of dispatchers 230a-n appears as a single entity to the router 210. Typically, the dispatchers 230a-n will all have the same network address; however, it is within the scope of the present invention for the plurality of dispatchers 230a-n to each exhibit a unique network address. As used herein, the term "network address" refers to a MAC or layer 2 address or an equivalent thereof. A dispatcher 230 may comprise any suitable dispatcher known in the art, including any commercially available, off-the-shelf dispatcher or equivalent device.

A system area network (SAN) 240, or other suitable network, interconnects the plurality of dispatchers 230, such that the dispatchers 230a-n may communicate with one another. The SAN 240 may include any suitable network architecture. In one embodiment, the SAN 240 includes an InfiniBand® network architecture. See *InfiniBand Architecture Specification Volume* 1, Release 1.0.a, June 2001, and *InfiniBand Architecture Specification Volume* 2, Release 1.0.a, June 2001. The InfiniBand® architecture exhibits a number of desirable characteristics, including both high performance and reliability, as well as low overhead, low latency, and atomic operation. Atomic operation generally refers to the performance of a task (e.g., transmission of data) without interruption (e.g., read and write between the origination and destination addresses occurs without interruption by other nodes or devices) and that the task is guaranteed to complete successfully.

It should be understood, however, that the SAN 240 is not limited to the InfiniBand® architecture and, further, that the SAN 240 may utilize any suitable network technology. For example, the SAN 240 may include an architecture utilizing cLAN® technology available from the Emulex Corporation, or the SAN 240 may include a Virtual Interface Architecture (VIA). See *Virtual Interface Architecture Specification*, Version 1.0, December 1997. In other embodiments, the SAN 240 comprises a network including an Ethernet, Fast Ethernet, or Gigabit Ethernet architecture.

The server hosting system 200 also includes a plurality of servers 250, including servers 250a, 250b, ..., 250m. Each server 250 is coupled with each of the plurality of dispatchers 230a-n, respectively, via the SAN 240. A server 250 may comprise any suitable server or other computing device known in the art, including any one of numerous commercially available, off-the-shelf servers. The plurality of servers, or server cluster, 250a-m is assigned a VIP address. All incoming client connection requests addressed to the VIP are assigned to one of the servers 250a-m for processing, as will be described in greater detail below.

Each dispatcher 230 maintains a local dispatch table 235, the plurality of dispatchers 230a-n including local dispatch tables 235a, 235b, ..., 235n, respectively. The local dispatch table 235 of any dispatcher 230 includes a session entry for each client session currently in progress on the server hosting system 200, each session entry identifying the client and the server 250 assigned to the client's session. When any one of the dispatchers 230a-n places a session entry on (or removes a session entry from) its local dispatch table 235, that dispatcher 230 broadcasts a dispatch table update over SAN 240 to all other dispatchers 230. Accordingly, the dispatch tables 235a-n of the plurality of dispatchers 230a-n contain shared data, and an accurate and up-to-date list of client sessions is maintained in the local dispatch table 235 of all dispatchers 230a-n, respectively.

Maintaining a local dispatch table 235 on each of the dispatchers 230a-n, respectively, and sharing data amongst all local dispatch tables 235a-n enables any one of the dispatchers 230a-n to receive and route an incoming packet, thereby providing multiple points of entry for client communications directed to the server cluster 250a-m (i.e., those communications addressed to the cluster's VIP address). Thus, by providing multiple points of entry into the sever cluster 250a-m, the bottleneck exhibited by conventional server hosting systems—such as occurs at the dispatcher 130 of the server hosting system 100 illustrated in FIG. 1—is substantially reduced or eliminated. These favorable characteristics of the server hosting system 200, as well as other advantageous properties, may be better understood with reference to a method of server load balancing, as will now be described in greater detail.

Figure 3:
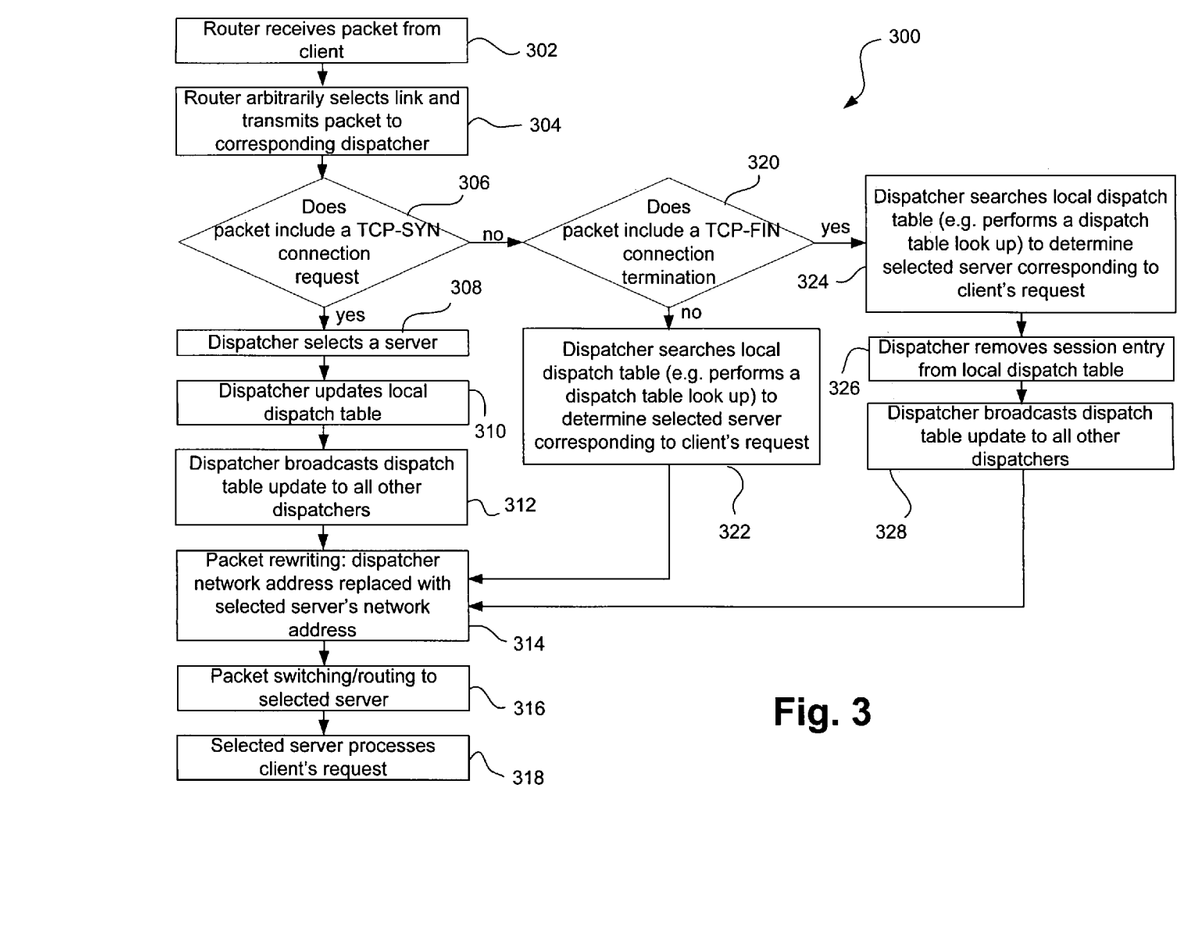
FIG. 3 shows an embodiment of a method for server load balancing using a plurality of dispatchers.

The flow chart of FIG. 3 illustrates a method 300 of server load balancing among the plurality of servers 250a-m. Referring to reference numeral 302, the router 210 receives a packet from a client. The router 210 arbitrarily selects one of the communication links 220a-n coupled with its port 212, as denoted at 304, and transmits the packet to the dispatcher 230 connected with the selected communication link 220. For an incoming packet, the selected communication link 220 may comprise any one of the communications links 220a-n.

In an alternative embodiment, rather than randomly selecting one of the communication links 220a-n, the router 210 may select a communication link 220 according to any given policy or set of rules, as described above. For example, the router 210, in selecting a communication link 220, may simply alternate from one communication link 220 to the next in a round-robin fashion, or the router 210 may select a communication link 220 based upon the load on the communication links 220a-n.

In yet a further embodiment, as noted above, the router 210 initially selects one of the dispatchers 230a-n. For example, the router 210 may randomly select a dispatcher 230, or the router 210 may select a dispatcher 230 according to a given policy or set of rules (e.g., in a round robin fashion or based upon the load on each of the dispatchers 230a-n). Subsequently, the communication link 220 corresponding to the selected dispatcher 230 is then selected by the router 210 and the packet transmitted over this communication link 220. Because each of the dispatchers 230a-n provides a point of entry into the server cluster 250a-m, as noted above, any one of the dispatchers 230a-n may be selected to receive a packet and to route that packet to the appropriate server 250.

Referring to reference numeral 306, it is then determined whether the incoming packet includes a connection (TCP SYN) request. If the incoming packet includes a connection request, the dispatcher 230 selects one of the servers 250a-m, as denoted by reference numeral 308. A server 250 may be selected based upon the load on each of the servers 250a-m and/or upon other specified policy or rules. For example, in addition to assessing the load on each server 250a-m, the load on SAN 240 may also be taken into consideration. For ease of understanding, the server 250 that is selected will be referred to herein as the "selected" server. However, it should be understood that the "selected" server may comprise any one of the plurality of servers 250a-m. Also, in an alternative embodiment, as will be explained in detail below, a server 250 may be selected using application-aware load balancing.

Figure 4:
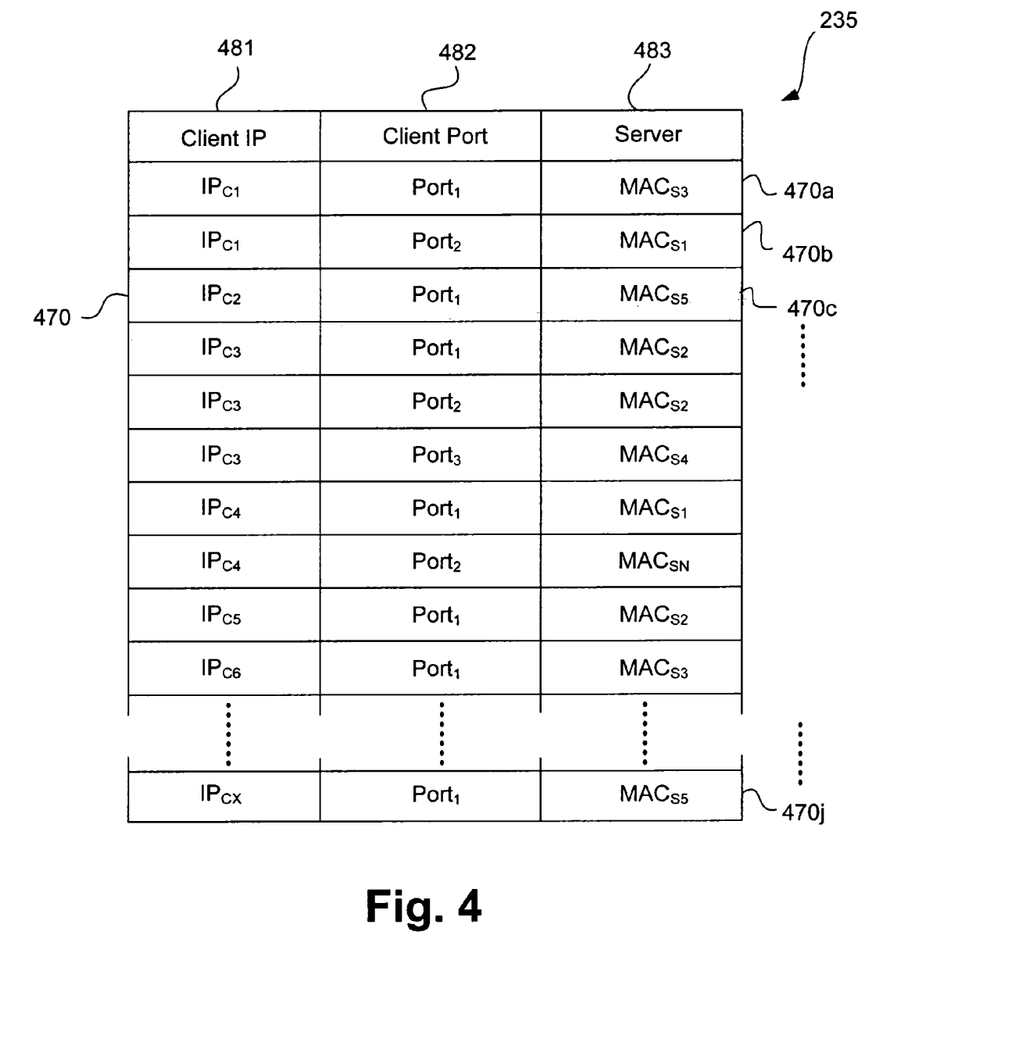
FIG. 4 shows an embodiment of a local dispatch table maintained in one of the multiple dispatchers shown in FIG. 2.

As shown at reference numeral 310, the dispatcher 230 then updates its local dispatch table 235 by creating a session entry identifying the client and the selected server 250. An exemplary embodiment of a local dispatch table 235 is shown in FIG. 4. The local dispatch table 235 includes one or more session entries 470, including, for example, session entries 470a, 470b, . . . , 470j. Each session entry 470 identifies at least the client and the selected server 250, although a session entry 470 may include additional information. Accordingly, a session entry 470 may include the client IP address 481, the client port (e.g., a transport layer port) 482, and the network address 483 of the selected server 250. The session entry 470 may also include a destination port (not shown in FIG. 4) of the selected server 250. For example, session entry 470a indicates that a port ($PORT_1$) of a first client ($IP_{C1}$) is assigned to the third server ($MAC_{S3}$), whereas session entry 470b indicates that another port ($PORT_2$) of the first client ($IP_{C1}$) is assigned to the first server ($MAC_{S1}$). Similarly, session entry 470c indicates that a port ($PORT_1$) of a second client ($IP_{C2}$) is assigned to the fifth server ($MAC_{S5}$), and so on.

Denoted at reference numeral 312, the dispatcher 230 broadcasts a dispatch table update to all other dispatchers 230a-n. The dispatch table update includes at least the session entry data entered into the local dispatch table 235 of the broadcasting dispatcher 230, so that the other dispatchers 230a-n may create a corresponding session entry in their respective local dispatch tables 235a-n. This shared data maintained in the local dispatch tables 235a-n of the plurality of dispatchers 230a-n, respectively, enables any dispatcher 235 to receive a packet associated with an existing session and to route that packet to the appropriate server 250. The dispatcher 250 broadcasts the dispatch table update over the SAN 240 and, for an InfiniBand® SAN 240, the dispatch table updates may be broadcast using atomic operation. Also, the dispatch table update may be compressed prior to transmission.

Once a server 250 has been selected to process the incoming connection request, the packet is modified such that it will be routed to the selected server 250. For example, as shown at reference numeral 314, packet rewriting may be performed. During packet rewriting, the dispatcher network address (again, all dispatchers 230a-n may have the same network address) is replaced with the network address of the selected server 250. However, it should be understood that a packet may be directed to the selected server 250 using any other suitable method. By way of example, the servers 250a-m may have private IP addresses, wherein incoming packets are dispatched to the appropriate server 250 using network address translation.

Referring to reference numeral 316, packet switching then occurs, and the packet is routed to the selected server 250. The selected server 250 processes the client's request, as denoted at 318, and sends a response, if necessary. If the packet included a connection request, the selected server 250 creates a session and sends and acknowledgement (TCP SYN-ACK) to the client.

If the incoming packet does not include a connection request, it is then determined whether the packet includes a connection termination (TCP FIN) request, as denoted at 320. Referring to reference numeral 322, if the packet does not include a termination request (and, as noted above, the packet does not include a connection request), the dispatcher 230 will search its local dispatch table 235—i.e., a dispatch table look up—to determine the selected server 250 assigned to the client's session, the selected server 250 for the session in progress having been chosen upon receipt of the connection request for that session. Once the selected server 250 is identified, the packet may be modified (e.g., packet rewriting) and routed to the selected server 250 for processing, as denoted by reference numerals 314, 316, and 318, respectively.

Referring now to reference numeral 324, if the incoming packet includes a connection termination request (TCP FIN), the dispatcher 230 performs a dispatch table look up to find the server 250 selected to handle the session corresponding to the termination request, the selected server 250 having been chosen after receipt of the connection request for that session. Since no additional packets relating to the client's session will be received (i.e., the client requested termination of the session), the dispatcher 230 removes the corresponding session entry from its local dispatch table 235, as denoted by reference numeral 326.

Referring to reference numeral 328, the dispatcher broadcasts a dispatch table update to all other dispatchers 230a-n, the dispatch table update indicating the removal of the session entry from the local dispatch table 235 of all other dispatchers 230a-n. The dispatcher broadcasts the dispatch table update over the SAN 240. Again, the dispatch table update may be broadcast using atomic operation, and/or the dispatch table update may be compressed prior to transmission.

The selected server 250 having been identified (see reference numeral 324), the packet may be modified (e.g., packet rewriting) and routed to the selected server 250 for processing, as denoted by reference numerals 314, 316, and 318, respectively. For a packet including a connection termination request, the selected server 250 processes the packet and terminates the session with the client.

Although not illustrated in FIG. 3, those of ordinary skill in the art will appreciate that other conditions or events may result in the termination of a client session. For example, if a communication is not received from a client for a specified period of time—an event commonly known as a session "time-out"—the client's session may be automatically terminated by the server hosting system 200. If a session time-out occurs, the method 300 of load balancing proceeds as shown and described above with respect to FIG. 3, except that no termination request is received from the client and termination of the session is initiated by the selected server 250.

Any packet (e.g., a connection request or other service request) received from a client can be processed according to the method 300 of server load balancing illustrated and described with respect to FIG. 3. Because the server hosting system 200 provides multiple points of entry into the server cluster 250a-m—and, therefore, because a bottleneck does not precede the server cluster 250a-m—all incoming client requests will be processed with minimal or no delay.

Figure 5:
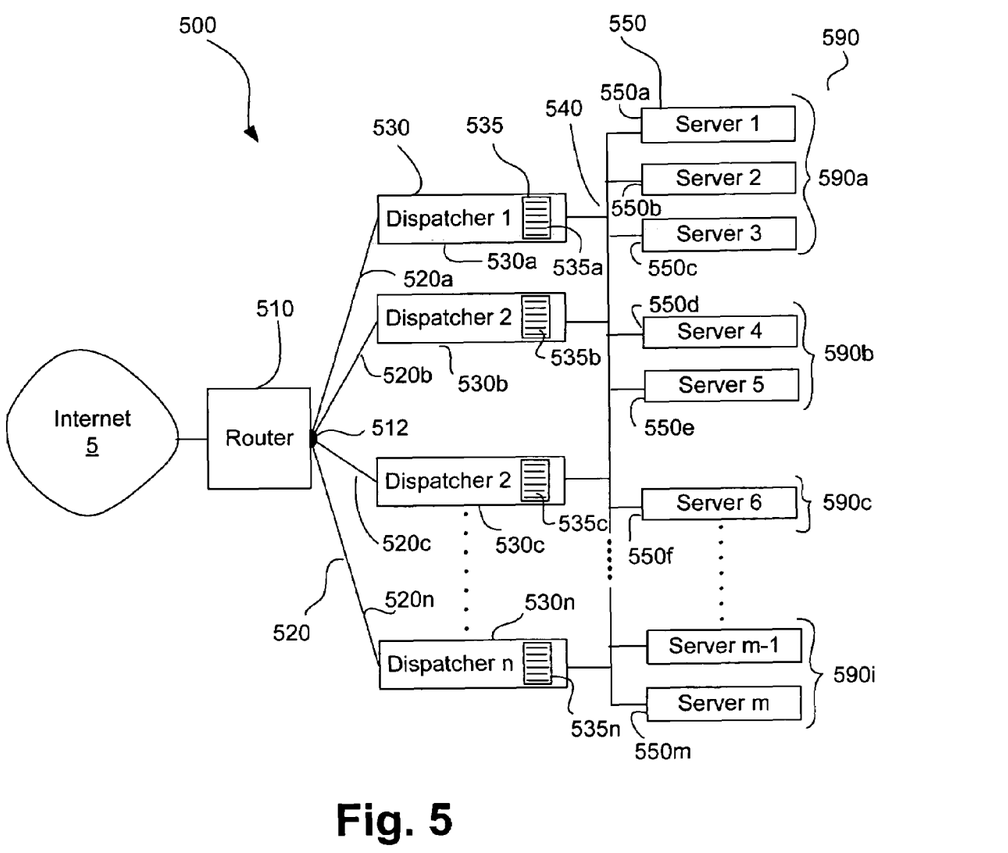
FIG. 5 shows another embodiment of a server hosting system including multiple dispatchers.

As has been previously suggested, the present invention is equally applicable to application-aware load balancing. An embodiment of a server hosting system 500 that may utilize application-aware load balancing is illustrated in FIG. 5. The server hosting system 500 includes a router 510 having at least a port 512. A plurality of dispatchers 530, including dispatchers 530a, 530b, . . . , 530n, are each coupled with the port 512 by one communication link 520 of a plurality of communication links 520a, 520b, . . . , 520n. Each dispatcher 530 includes a local dispatch table 535, the dispatchers 530a-n having local dispatch tables 535a, 535b, . . . , 535n, respectively. An SAN 540 interconnects the plurality of dispatchers 530a-n, enabling each dispatcher 530 to communicate with all other dispatchers 530a-n.

Each of a plurality of servers 550, including servers 550a, 550b, . . . , 550m, is coupled with each of the plurality of dispatchers 530a-n, respectively, via the SAN 540. Thus, the server hosting system 500 is similar to the server hosting system 200 described above with respect to FIG. 2; however, the server hosting system 500 further includes a plurality of server groups 590, including server groups 590a, 590b, . . . , 590i. For example, server group 590a includes servers 550a, 550b, and 550c, whereas server group 590b includes servers 550d and 550e. Each server group 590 provides a specified application or service (e.g., email), each server 550 within a server group 590 generally being capable of providing the specified application. A server group 590 may include any suitable number of servers 550 sufficient to meet client demand for the service provided by that server group 590 and, further, a server group 590 may be configured to provide more than one application.

Figure 6:
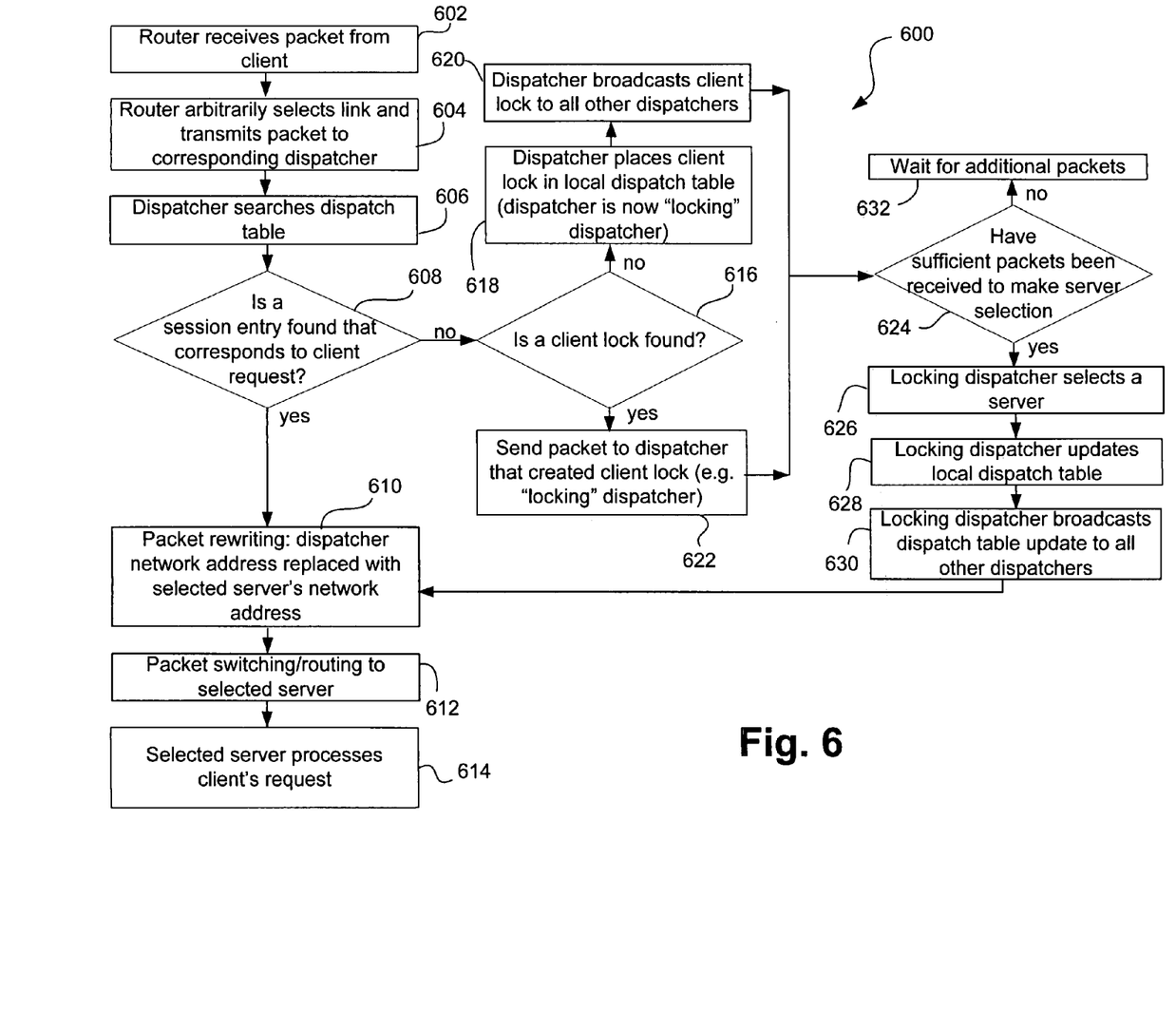
FIG. 6 shows another embodiment of a method for server load balancing using a plurality of dispatchers.

An exemplary embodiment of a method 600 of application-aware load balancing—as may be performed using the server hosting system 500 having server groups 590a-i—is illustrated in FIG. 6. Referring to reference numeral 602 of FIG. 6, the router 510 receives a packet from a client. The router 510 arbitrarily selects one of the communication links 520a-n coupled with its port 512, as denoted at 604, and transmits the packet to the dispatcher 530 connected with the selected communication link 520. For any incoming packet, the selected communication link 520 may comprise any one of the communications links 520a-n.

In an alternative embodiment, rather than randomly selecting one of the communication links 520a-n, the router 510 may select a communication link 520 according to any given policy or set of rules. For example, the router 510, in selecting a communication link 520, may simply alternate from one communication link to the next in a round-robin fashion, or the router 510 may select a communication link 520 based upon the load on the communication links 520a-n. In yet a further embodiment, the router 510 initially selects one of the dispatchers 530a-n. For example, the router 510 may randomly select a dispatcher 530, or the router 510 may select a dispatcher 530 according to a given policy or set of rules (e.g., in a round robin fashion or based upon the load on each of the dispatchers 530a-n). Subsequently, the communication link 520 corresponding to the selected dispatcher 530 is then selected by the router 510 and the packet transmitted over this communication link 520.

The dispatcher 530 then searches its local dispatch table 535, as denoted at 606, to determine whether a session entry corresponding to the incoming packet exists, as denoted at reference numeral 608. Note that for a packet including a connection request (TCP SYN), there would normally not be a corresponding session in progress. If a session entry is found, the packet is modified such that it will be routed to the selected server 550 (or server group 590). For example, referring to reference numeral 610, packet rewriting may be performed. During packet rewriting, the dispatcher network address (again, all dispatchers 530a-n may have the same network address) is replaced with the network address of the selected server 550. Once again, it should be understood that a packet may be directed to the selected server 550 using any other suitable method.

Referring to reference numeral 612, packet switching then occurs, and the packet is routed to the selected server 550. The selected server 550 processes the client's request, as denoted at 614, and sends a response, if necessary.

Referring again to reference numeral 608 in conjunction with reference numeral 616, if a session entry is not found, it is then determined whether a client lock exists. If no client lock exists, the dispatcher 530 places a client lock in its local dispatch table 535, as denoted at 618. A client lock is an indication to all other dispatchers 530a-n that the dispatcher 530 initiating the client lock is serving the client and that all subsequently received packets should be forwarded to that dispatcher 530 until a server 550 is selected. Typically, a client lock is created upon receipt of a packet including a connection request. The dispatcher 530 creating the client lock will be referred to herein as the "locking" dispatcher. As denoted at 620, the locking dispatcher then broadcasts the client lock to all other dispatchers 530a-n.

If a client lock associated with the incoming packet is identified, the packet is sent to the dispatcher 530 that previously created and broadcast the client lock—i.e., the locking dispatcher—as denoted at 622. In application-aware load balancing, it may not be possible for a dispatcher to identify the requested application or service based upon the information contained in the first-received packet (i.e., the packet including the connection request). Thus, forwarding any subsequently received packets to the locking dispatcher allows the locking dispatcher to "view" a number of packets sufficient to make an application-aware server selection.

After sending the packet to the locking dispatcher (see reference numeral 622), the locking dispatcher determines whether a sufficient number of packets have been received to make an application-aware server selection, as shown at reference numeral 624. If the locking dispatcher has a sufficient number of packets to determine the requested application, the locking dispatcher selects the appropriate server 550 (or server group 590), as denoted at 626. Referring to reference numeral 628, the locking dispatcher then updates its local dispatch table 535 by creating a session entry identifying the client and the selected server 550. It should be noted that the locking dispatcher may have sufficient information to identify the requested application after receipt of the first packet including a connection request (see reference numerals 618, 620, and 624).

As shown at reference numeral 630, the locking dispatcher then broadcasts a dispatch table update to all other dispatchers 530a-n. The dispatch table update indicates the removal of the client lock, as well as including the session entry data entered into the local dispatch table 535 of the locking dispatcher. Accordingly, the other dispatchers 530a-n may create a corresponding session entry in their respective local dispatch tables 535a-n. Again, the shared data maintained in the local dispatch tables 535a-n of the plurality of dispatchers 530a-n enables any dispatcher 535 to receive a packet associated with an existing session and to route that packet to the appropriate server 550. The locking dispatcher broadcasts the dispatch table update over the SAN 540 and, for an InfiniBand® SAN 540, the dispatch table update may be broadcast using atomic operation. Also, the dispatch table update may be compressed prior to transmission.

Once a server 550 is selected, the packet may be modified (e.g., packet rewriting) and routed to the selected server 550 for processing, as denoted by reference numerals 610, 612, and 614, respectively. If the locking dispatcher does not have sufficient packets to determine the requested application (see reference numeral 624), the locking dispatcher waits for additional packets, as denoted at 632.

For the method 600 of application-aware load balancing, once a sufficient number of packets have been received to make a server selection, receipt and routing of packets generally proceeds in accordance with the method 300 of server load balancing shown and described with respect to FIG. 3. After server selection and removal of the client lock, all packets associated with the newly created session are routed by any one of the dispatchers 530a-n to the selected server 550, and it is no longer necessary to forward a packet to the locking dispatcher.

Each of the server hosting systems 200, 500 illustrated in FIGS. 2 and 5, respectively, is easily scalable to meet increased growth in network traffic directed to the server cluster 250a-n, 550a-n. To provide increased capacity, one or more servers 250, 550 and/or one or more dispatchers 230, 530 may be added to the server hosting system 200, 500. Further, because additional dispatchers 230, 530 and/or servers 250, 550 may be integrated into the server hosting system 200, 500 during operation and without the need for a shut down, such a server hosting system 200, 500 provides dynamic scalability. The SAN 240, 540 may be expanded to include any additional servers 250, 550 and/or dispatchers 230, 530 and, ultimately, the server hosting system 200, 500 may include any desired number of servers 250, 550, as well as any desired number of dispatchers 230, 530.

Also, although each of the server hosting systems 200, 500 is illustrated as being coupled with the Internet 5, it should be understood that any of the embodiments of a server hosting system 200, 500 described herein may be coupled with any computer network, or plurality of computer networks. By way of example, a server hosting system 200, 500 may be coupled with Local Area Networks (LANs), Wide Area Networks (WANs), and/or Metropolitan Area Networks (MANs).

Embodiments of a scalable server hosting system 200, 500 including multiple dispatchers 230, 530—as well as methods 300, 600 of server load balancing—having been herein described, those of ordinary skill in the art will appreciate the many advantages thereof. The server hosting systems 200, 500 provides multiple points of entry into a server cluster 250a-m, 550a-m, thereby eliminating the bottleneck exhibited by conventional web servers while providing a web server exhibiting high availability and high performance to prospective clients. The multiple entry points into the server cluster 250a-m, 550a-m is provided by a plurality of dispatchers 230a-n, 530a-n, which are interconnected by an SAN 240, 540, each dispatcher 230, 530 having a local dispatch table 235, 535. The local dispatch tables 235a-n, 535a-n of the dispatchers 230a-n, 530a-n, respectively, share data via broadcasts over SAN 240, 540, enabling any one of the dispatchers 230a-n, 530a-n to receive and properly route an incoming packet.

A server hosting system 200, 500, having a plurality of dispatchers 230a-n, 530a-n coupled with a server cluster 250a-m, 550a-m, is also easily scalable to provide increased capacity. Dispatchers 230, 530 and/or servers 250, 550 may be added as necessary to increase capacity and enhance system performance, and any suitable number of dispatchers 230, 530 and servers 250, 550 may be employed. In addition, such a server hosting system 200, 500 is highly fault tolerant, as reliable operation does not depend on a single dispatcher. When a dispatcher 230, 530 fails, the remaining dispatchers 230a-n, 530a-n continue to function and provide a reasonable level of performance. Further, because commercially available, off-the-shelf hardware may be used to construct a server hosting system 200, 500, the server hosting systems 200, 500 exhibit low cost.

The foregoing detailed description and accompanying drawings are only illustrative and not restrictive. They have been provided primarily for a clear and comprehensive understanding of the present invention and no unnecessary limitations are to be understood therefrom. Numerous additions, deletions, and modifications to the embodiments described herein, as well as alternative arrangements, may be devised by those skilled in the art without departing from the spirit of the present invention and the scope of the appended claims.

What is claimed is:

1. A method comprising:
receiving a packet at one dispatcher of a plurality of dispatchers, the plurality of dispatchers coupled with a plurality of servers;
searching a local dispatch table of said one dispatcher;
transmitting the packet from said one dispatcher to a server of the plurality of servers if the local dispatch table identifies the server; and
transmitting the packet from said one dispatcher to a locking dispatcher of the plurality of dispatchers if the local dispatch table includes a client lock, the client lock indicating that communications received from a client are to be transmitted to the locking dispatcher until a server is selected for the client,
wherein:
the client lock is placed in the local dispatch table by said one dispatcher when said one dispatcher determines that there exists no session entry corresponding to the packet and determines that the client lock does not already exist.

2. The method of claim 1, wherein the local dispatch table includes the client lock, the method further comprising:
selecting a server from the plurality of servers; and
transmitting the packet from the locking dispatcher to the selected server.

3. The method of claim 2, further comprising broadcasting a dispatch table update from the locking dispatcher to all other dispatchers of the plurality of dispatchers, the dispatch table update identifying the selected server and indicating removal of the client lock.

4. A method comprising:
receiving a first packet at one dispatcher of a plurality of dispatchers, the first packet including a connection request from a client;

searching for a session entry corresponding to the first packet;

if the session entry is not found, creating a client lock on packets received from the client and placing the client lock in a local dispatch table corresponding to said one dispatcher, the client lock indicating that packets received from the client are to be transmitted to said one dispatcher until a server is selected for the client; and broadcasting a dispatch table update from said one dispatcher to all other dispatchers of the plurality of dispatchers, the dispatch table update indicating the client lock; and receiving at least a second packet at another dispatcher of the plurality of dispatchers; and transmitting the second packet from said another dispatcher to said one dispatcher.

5. The method of claim 4, further comprising:

selecting a server from a plurality of servers coupled with the plurality of dispatchers; and transmitting the first packet and the second packet to the selected server.

6. The method of claim 5, further comprising broadcasting another dispatch table update from said one dispatcher to said all other dispatchers, said another dispatch table update identifying the selected server and indicating removal of the client lock.

7. An article of manufacture comprising:

a machine accessible medium, the machine accessible medium providing instructions that, when executed by a machine, cause the machine to:

receive a packet at one dispatcher of a plurality of dispatchers, the plurality of dispatchers coupled with a plurality of servers;

search a local dispatch table of said one dispatcher;

transmit the packet from said one dispatcher to a server of the plurality of servers if the local dispatch table identifies the server; and transmit the packet from said one dispatcher to a locking dispatcher of the plurality of dispatchers if the local dispatch table includes a client lock, the client lock indicating that communications received from a client are to be transmitted to the locking dispatcher until a server is selected for the client, wherein:

the client lock is placed in the local dispatch table by said one dispatcher when said one dispatcher determines that there exists no session entry corresponding to the packet and determines that the client lock does not already exist.

8. The article of manufacture of claim 7, the local dispatch table including the client lock, wherein the instructions, when executed, further cause the machine to:

select a server from the plurality of servers; and transmit the packet from the locking dispatcher to the selected server.

9. The article of manufacture of claim 8, wherein the instructions, when executed, further cause the machine to broadcast a dispatch table update from the locking dispatcher to all other dispatchers of the plurality of dispatchers, the dispatch table update identifying the selected server and indicating removal of the client lock.

10. An article of manufacture comprising:

a machine accessible medium, the machine accessible medium providing instructions that, when executed by a machine, cause the machine to:

receive a first packet at one dispatcher of a plurality of dispatchers, the first packet including a connection request from a client;

search for a session entry corresponding to the first packet;

if the session entry is not found, create a client lock on packets received from the client and placing the client lock in a local dispatch table corresponding to said one dispatcher, the client lock indicating that packets received from the client are to be transmitted to said one dispatcher until a server is selected for the client;

broadcast a dispatch table update from said one dispatcher to all other dispatchers of the plurality of dispatchers, the dispatch table update indicating the client lock; and receive at least a second packet at another dispatcher of the plurality of dispatchers; and transmit the second packet from said another dispatcher to said one dispatcher.

11. The article of manufacture of claim 10, wherein the instructions, when executed, further cause the machine to:

select a server from a plurality of servers coupled with the plurality of dispatchers; and transmit the first packet and the second packet to the selected server.

12. The article of manufacture of claim 11, wherein the instructions, when executed, further cause the machine to broadcast another dispatch table update from said one dispatcher to said all other dispatchers, said another dispatch table update identifying the selected server and indicating removal of the client lock.

* * * * *